United States Patent Office 3,594,110
Patented July 20, 1971

3,594,110
PROCESS FOR DYEING SHAPED ACRYLONITRILE COPOLYMERIZATES
Wilhelm Happe, Schwalbach, Taunus, Erich Heitzer, Königstein, Taunus, Stefan Müllner, Frankfurt am Main, and Helmut Rinno, Lorsbach, Taunus, Germany, assignors to Farbwerke Hoechst Aktiengesellschaft vormals Meister Lucius & Bruning, Frankfurt am Main, Germany
No Drawing. Filed Feb. 19, 1968, Ser. No. 706,615
Claims priority, application Germany, Feb. 28, 1967, F 51,667
Int. Cl. D06p 1/18
U.S. Cl 8—4                                      8 Claims

ABSTRACT OF THE DISCLOSURE

A process for fast dyeing a shaped article of a copolymerizate of (a) styrene-acrylonitrile, methacrylic acid lower alkyl ester or acrylonitrile and (b) about 0.1 to about 5.0 mol percent of a vinyl compound of the formula $$R_4-C=C-C-N-Ph-A-X$$
$$\phantom{R_4-}R_3\phantom{=}R_2\phantom{-}O\phantom{-}R_1$$

wherein $R_1$ and $R_2$ each is hydrogen or an alkyl of 1 to 4 carbon atoms, $R_3$ and $R_4$ each is hydrogen or a group $-COOCH_3$, $-COOC_2H_5$, $-COOC_3H_7$ or $-COOC_4H_9$, or $R_1$ and $R_4$ form a ring with a $-CO-$ bridge, Ph is phenylene, alkoxy-phenylene or chlorophenylene, A is a group $-SO_2C_2H_4-$ at the m or p position to the amido group, and X is a group of $-OSO_3Me$ or $-OCOCH_3$ in which Me is ammonium, sodium or potassium, which comprises treating said shaped article with an aqueous solution or dispersion of a monoazo dyestuff having a reactive hydrogen atom at a temperature of about 90° C. to about 120° C. at a pH of about 5 to about 10.

---

It is known that substrates consisting mostly of polyacrylonitrile can be dyed with dispersion dyestuffs, for example of the kind used for dyeing acetate rayon. These dyeings, however, show only a limited intensity of colour and, moreover, a relatively low fastness to washing and to solvents. The possibility that polyacrylonitrile and the copolymerizates thereof can be dyed, because of a certain content therein of anionic groups as for example, $-O-SO_3H-$ groups, with cationic dyestuffs is of much greater importance. The linkage between dyestuff and substrate in the dyeings thus obtained is of the nature of salts and thus more or less exposed to hydrolysis.

It has now been found that synthetic materials containing reactive groups can be fast dyed by treating copolymerizates comprising one or more vinyl monomers and vinyl compounds of the general formula $$R_4-C=C-C-N-Ph-A-X$$
$$\phantom{R_4-}R_3\phantom{=}R_2\phantom{-}O\phantom{-}R_1 \quad (1)$$

wherein $R_1$ and $R_2$ represent hydrogen atoms or alkyl radicals of 1 to 4 carbon atoms and $R_3$ and $R_4$ represent hydrogen atoms or groups of the formula $-CO-OCH_3$, $-CO-OC_2H_5$, $-CO-OC_3H_7$, or $-CO-OC_4-H_9$, $R_1$ and $R_3$ or $R_1$ or $R_4$ respectively may be connected, if desired via a $-CO-$ bridge member, under ring closure, Ph represents a phenylene group or an alkoxy or halogen derivative thereof, A represents one of the groupings of the formula

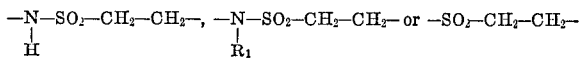

which grouping being in m or p position to the N-amide-linkage and wherein $R_1$ has the meaning given above, and X represents a grouping of the formula
$$-O-SO_3Me^I, -O-CO-CH_3 \text{ or } -[N(CH_3)_3]^+$$
wherein $Me^I$ represents an ammonium group or an alkali metal atom, preferably potassium, or a mixture of such polymers, with those dyestuffs which contain reactive hydrogen atoms.

In the course of the dyeing according to the process of the present invention the reactive groups of substrate and dyestuff become active whereby the constituents are linked with one another via a valence linkage. Thus, dyestuff and substrate are dyed faster than it has been possible hitherto.

As synthetic materials to be dyed according to the process of the present invention, there may be mentioned copolymerizates and mixtures of polymers consisting, for example, of acrylonitrile, vinylidene cyanide, styrene, acrylic acid lower alkyl esters, methacrylic acid lower alkyl ester, vinyl acetate, vinyl butyrate, vinyl pivalate, vinyl chloride, vinylidene chloride, maleic acid lower alkyl ester and other monomers, and vinyl compounds of the Formula 1. In the synthetic materials used the reactive vinyl monomer of the Formula 1 is contained in amounts ranging from about 0.1 to about 5 mol percent, referred to the portion of the other comonomers.

As dyestuffs that are suitable to react with the reactive groups in the substrate, there may be mentioned according to the process of the present invention those dyestuffs containing reactive hydrogen atoms linked to a nitrogen or oxygen atom and thus present in form of a NH— or OH— grouping. NH— groupings neighboring a $SO_2-$ grouping, or OH— groupings the hydrogen atom of which has become particularly mobile by an adjacent $-SO_2-$ or $-SO_2N-$ group, have proved to be especially reactive. Those dyestuffs may belong to the class of dispersion or water-soluble dyestuffs. Furthermore, they may represent metal complex dyestuffs.

Dyeing is carried out, according to the process of the present invention, at a temperature ranging from about 90° to about 120° C. and at a pH value of from about 5 to about 10.

For carrying out the dyeings, the synthetic materials to be dyed may be present in form of a powder, a dispersion or of articles shaped in the heat or from solution.

The following examples illustrate the invention, but they are not intended to limit it thereto.

EXAMPLE 1

5 grams of a powdery copolymerizate consisting of 75 parts by weight of styrene, 23 parts by weight of acrylonitrile and 2 parts by weight of the compound of the formula

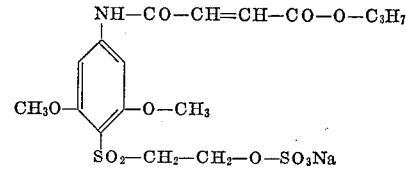

are dyed for 1 hour at 100° C. in a bath containing 0.1 g. of a dispersion of the dyestuff of the formula

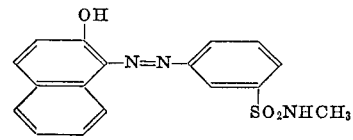

in 200 cc. of water. The dyed substrate is then washed for about 10 minutes at 60° C. with a non-ionogenic washing agent of the type of the ethylene oxide polyaddition products. An orange dyeing is obtained having excellent fastness to washing.

EXAMPLE 2

5 grams of a copolymerizate consisting of 75 parts by weight of styrene, 23 parts by weight of acrylonitrile, and 2 parts by weight of the compound of the formula $$\text{NH–CO–CH=CH}_2\text{–C}_6\text{H}_3\text{–SO}_2\text{–CH}_2\text{–CH}_2\text{–O–CO–CH}_3$$

are dyed according to the indications given in Example 1, using, however, the dyestuff corresponding to the formula $$\text{OH–naphthyl–N=N–C}_6\text{H}_4\text{–SO}_2\text{N(CH}_2\text{–CH}_2\text{–OH)}_2$$

The dyeing obtained has an excellent fastness to washing.

EXAMPLE 3

5 grams of a copolymerizate consisting of 75 parts by weight of styrene, 23 parts by weight of acrylonitrile, and 2 parts by weight of the compound of the formula $$\text{NH–CO–CH=CH}_2\text{–C}_6\text{H}_3\text{–SO}_2\text{–CH}_2\text{–CH}_2\text{–O–SO}_3\text{K}$$

are dyed with the dyestuff used in Example 2 in analogous manner. The yellowish-orange dyeing thus obtained has a very good fastness to washing.

EXAMPLE 4

5 grams of a copolymerizate consisting of 75 parts by weight of styrene, 23 parts by weight of acrylonitrile, and 2 parts by weight of the compound of the formula $$\text{(maleimido)–C}_6\text{H}_4\text{–SO}_2\text{–CH}_2\text{–CH}_2\text{–O–SO}_3\text{K}$$

are dyed according to the dyeing method defined in Example 1, using however, the dyestuff corresponding to the formula $$\text{OH–naphthyl–N=N–C}_6\text{H}_4\text{–NH–SO}_2\text{–NH}_2$$

A fast orange dyeing is obtained.

EXAMPLE 5

5 grams of a copolymerizate consisting of 98 parts by weight of methacrylic acid methyl ester and 2 parts by weight of a compound corresponding to the formula $$\text{NH–CO–CH=CH}_2\text{–C}_6\text{H}_3\text{–SO}_2\text{–CH}_2\text{–CH}_2\text{–O–SO}_3\text{K}$$

are dyed with the dyestuff used in Example 2 under the same conditions. A yellow dyeing is obtained, having very good properties of fastness.

EXAMPLE 6

5 grams of endless threads made of a copolymerizate consisting of 96 parts by weight of acrylonitrile and 4 parts by weight of the compound of the formula $$\text{CH}_2\text{=CH–CO–NH–C}_6\text{H}_4\text{–SO}_2\text{–CH}_2\text{–CH}_2\text{–O–SO}_3\text{K}$$

(spun from dimethylsulfoxide) are washed for 15 minutes at 98° C. with a bath containing per liter 0.5 gram of a non-ionogenic washing agent of the type of the ethylene oxide polyaddition products and 0.5 gram of sodium carbonate.

Then the threads are dyed with the dyestuff used in Example 1 in analogous manner. An orange dyeing is obtained which has a very good fastness to perspiration.

When using the polymerizates mentioned in the Examples 1 to 6 without incorporating the monomer having the reactive group, dyeings are obtained having only poor fastness properties.

We claim:

1. A process for fast dyeing a shaped article of a copolymerizate of (a) styrene-acrylonitrile, methacrylic acid lower alkyl ester or acrylonitrile and (b) about 0.1 to about 5.0 mol percent of a vinyl compound of the formula $$R_4\text{–C=C–C–N–Ph–A–X}$$
$$\quad\ \ |\ \ |\ \ \|\ \ \ |$$
$$\quad R_3\ R_2\ O\ R_1$$

wherein $R_1$ and $R_2$ each is hydrogen or an alkyl of 1 to 4 carbon atoms, $R_3$ and $R_4$ each is hydrogen or a group —COOH$_3$, —COOC$_2$H$_5$, —COOC$_3$H$_7$ or —COOC$_4$H$_9$, or $R_1$ and $R_4$ form a ring with a —CO— bridge, Ph is phenylene, alkoxy-phenylene or chlorophenylene, A is a group —SO$_2$C$_2$H$_4$— at the m or p position to the amido group, and X is a group —OSO$_3$Me or —OCOCH$_3$ in which Me is ammonium, sodium or potassium, which comprises treating said shaped article with an aqueous solution or dispersion of a monoazo dyestuff having a reactive hydrogen atom at a temperature of about 90° C. to about 120° C. at a pH of about 5 to about 10.

2. A process according to claim 1 wherein said shaped article is a thread.

3. A process according to claim 1 wherein said copolymerizate is of (a) styrene-acrylonitrile and (b)
$$\text{NH–CO–CH=CH–COOC}_3\text{H}_7\text{–C}_6\text{H}_2(\text{OCH}_3)_2\text{–SO}_2\text{C}_2\text{H}_4\text{–OSO}_3\text{Na}$$

4. A process according to claim 1 wherein said copolymerizate is of (a) styrene-acrylonitrile and (b)
$$\text{CH}_2\text{=CH–CONH–C}_6\text{H}_4\text{–SO}_2\text{C}_2\text{H}_4\text{–O–COCH}_3$$

5. A process according to claim 1 wherein said copolymerizate is of (a) styrene-acrylonitrile and (b)
$$\text{CH}_2\text{=CH–CONH–C}_6\text{H}_4\text{–SO}_2\text{C}_2\text{H}_4\text{–OSO}_3\text{K}$$

6. A process according to claim 1 wherein said copolymerizate is of (a) styrene-acrylonitrile and (b)
$$\text{(maleimido)–C}_6\text{H}_4\text{–SO}_2\text{C}_2\text{H}_4\text{–OSH}_3\text{K}$$

7. A process according to claim 1 wherein said copolymerizate is of (a) methacrylic acid methyl ester and
(b) 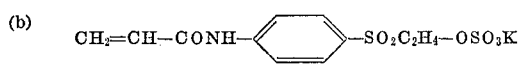
8. A process according to claim 1 wherein said copolymerizate is of (a) acrylonitrile and
(b) 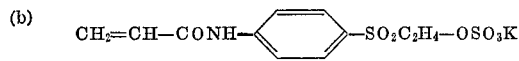
References Cited
UNITED STATES PATENTS
| | | | |
|---|---|---|---|
| 2,686,774 | 8/1954 | D'Alelio | 260—41CX |
| 2,762,719 | 9/1956 | Kleiner et al. | 8—18X |
| 3,083,177 | 3/1963 | Armen et al. | 260—41CX |
GEORGE F. LESMES, Primary Examiner
T. J. HERBERT, Jr., Assistant Examiner
U.S. Cl. X.R.
8—41, 177; 260—41, 79.7